United States Patent
Owens, Jr.

(10) Patent No.: US 9,308,869 B1
(45) Date of Patent: Apr. 12, 2016

(54) PORTABLE PORCH WITH INTEGRAL STAIRS

(71) Applicant: James W. Owens, Jr., Williamsville, MO (US)

(72) Inventor: James W. Owens, Jr., Williamsville, MO (US)

( * ) Notice: Subject to any disclaimer, the term of this patent is extended or adjusted under 35 U.S.C. 154(b) by 0 days.

(21) Appl. No.: 14/491,456

(22) Filed: Sep. 19, 2014

Related U.S. Application Data

(60) Provisional application No. 61/879,853, filed on Sep. 19, 2013.

(51) Int. Cl.
| | | |
|---|---|---|
| *B60R 3/00* | (2006.01) | |
| *B60R 3/02* | (2006.01) | |
| *E04F 11/18* | (2006.01) | |
| *E04G 1/28* | (2006.01) | |
| *E04G 27/00* | (2006.01) | |

(52) U.S. Cl.
CPC . *B60R 3/007* (2013.01); *B60R 3/02* (2013.01); *E04F 11/1865* (2013.01); *E04G 1/28* (2013.01); *E04G 27/00* (2013.01)

(58) Field of Classification Search
CPC ............. E04G 1/24; E04G 1/28; E04G 27/00; E06C 7/44; B60R 3/00; B60R 3/007; B60R 3/02; E04F 11/1865
See application file for complete search history.

(56) References Cited

U.S. PATENT DOCUMENTS

| | | | | |
|---|---|---|---|---|
| 2,203,114 | A * | 6/1940 | Uecker et al. | 248/188.4 |
| 3,693,754 | A * | 9/1972 | Butler | 182/86 |
| 3,808,757 | A * | 5/1974 | Greenwood | 52/184 |
| 3,912,298 | A * | 10/1975 | Humphrey | 280/166 |
| 4,457,397 | A * | 7/1984 | Scala | 182/116 |
| 4,570,962 | A | 2/1986 | Chavira | |
| 4,747,243 | A * | 5/1988 | Anstead | 52/184 |
| 4,759,162 | A * | 7/1988 | Wyse | 52/126.6 |
| 5,653,459 | A * | 8/1997 | Murphy | 280/166 |
| 6,659,224 | B2 | 12/2003 | Medsker | |
| 6,810,995 | B2 * | 11/2004 | Warford | 182/115 |
| 8,627,926 | B2 * | 1/2014 | Gordon | 182/115 |
| 2005/0231003 | A1 | 10/2005 | Rehkopf | |
| 2011/0198153 | A1 * | 8/2011 | Dufour et al. | 182/113 |

* cited by examiner

*Primary Examiner* — Colleen M Chavchavadze
(74) *Attorney, Agent, or Firm* — Grace J. Fishel

(57) ABSTRACT

A portable porch configured to at least partially attach to a recreational vehicle (RV) by integrating with a retractable step assembly associated with the vehicle for accessing a doorway in the vehicles's sidewall. The portable porch includes a platform, a plurality of adjustable legs, at least one railing, and a porch stairway for additional functionality and stability. The platform couples to an upper step of the retractable step assembly and at least one of the adjustable legs couples to a lower step in the retractable step assembly. Other features include support rods on the platform for attachment of the porch stairway.

12 Claims, 7 Drawing Sheets

PORTABLE PORCH WITH INTEGRAL STAIRS

BACKGROUND OF THE INVENTION

1. Field of the Invention

The present invention relates generally to a portable porch with integral stairs for a recreational vehicle having a retractable step assembly.

2. Brief Description of the Prior Art

Recreational vehicles have become larger, taller and more spacious, providing many of the comforts of a home away from home. However, many of today's recreational vehicles have a large ground clearance between the entrance and the ground. To address that issue, there are a number of retractable vehicle steps that have been developed to retract into or under the vehicle during storage and/or while the vehicle is in motion. But retractable steps are problematic in use because they are narrow and steep and either have no handrail or a grab bar that is pivoted to the vehicle. They are also somewhat flimsy and while the grab bar may have a stop, it may not be sturdy enough to hold a user if he or she slips on the steps which is not uncommon particularly for young children and older persons.

BRIEF SUMMARY OF THE INVENTION

In view of the above, it is an object of the present invention to provide a portable porch that integrates with the retractable step assembly on a recreational vehicle. It is another object to provide a portable porch that is easily assembled for use and disassembled for storage. Other objects and features of the invention will be in part apparent and in part pointed out hereinafter.

In one aspect of the invention, a portable porch is presented for attaching to an recreation vehicle, at least partially through a retractable step assembly associated with the vehicle for accessing a doorway in the vehicle's sidewall. In major part, the portable porch includes a platform, a plurality of adjustable legs, at least one railing and a porch stairway. The platform is configured to provide a support surface and a proximal end adapted to be coupled to a top step in the retractable step assembly. The plurality of adjustable legs are configured to extend from a platform lower surface, at least one of which is adapted to engage a ground surface and at least one of which is adapted to be coupled to a step below the upper step in the retractable step assembly. The at least one railing configured to extend from a platform upper face and being disposed to position around a periphery of the platform and the porch stairway being configured to attach to the platform.

In another aspect, the porch stairway has a pair of stringers between which a plurality of stair treads are supported with a dog leg at the upper end that is generally parallel to the platform at a point of attachment to the platform.

In yet another aspect, the platform has a first support rod extending from the distal end along the lower surface of the platform and a second support rod aligned with the first support rod extending from the distal side of the platform. The stringers have an aperture at the upper end through which the support rods are passed and upon which the porch stairway is attached to the platform.

A carriage for storing and transporting the major parts of the portable porch is provided. In one aspect, the carriage is a rack support configured to be mounted on a frame or bumper of the vehicle with two pair of brackets interleaved with two pair of support rods.

In another aspect of the carriage, a first of the pair of the carriage brackets is configured to receive vertical members of a first section of the at least one railing, a first of the pair of support rods is configured to receive stair treads in the porch stairway, a second of the pair of brackets is configured to receive vertical members of a second section of the at least one railing and a second of the pair of support rods is configured to receive frame members of the platform, all sandwiched together in the carriage.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible aspects of the invention are illustrated, corresponding reference characters refer to corresponding parts throughout the several views of the drawings in which.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended t limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
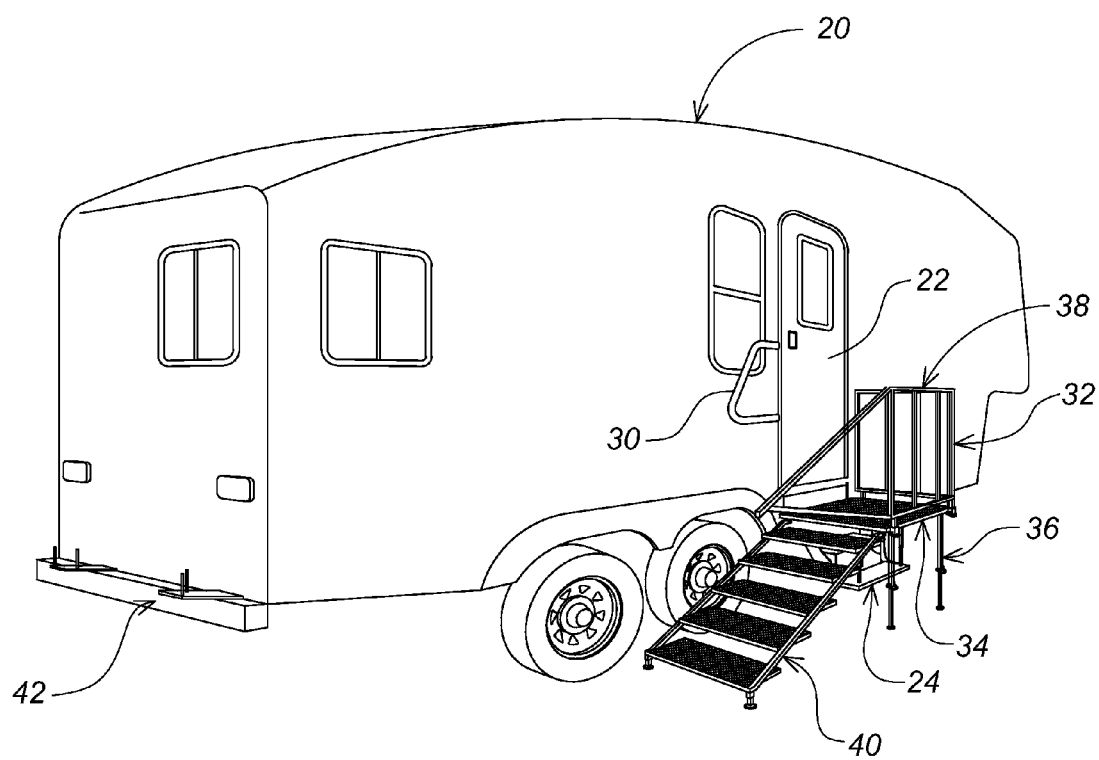
FIG. 1 is a perspective view of one portable porch in accordance with the present invention attached to a recreational vehicle having a retractable step assembly for accessing a doorway in the vehicle's sidewall.
Figure 2A:
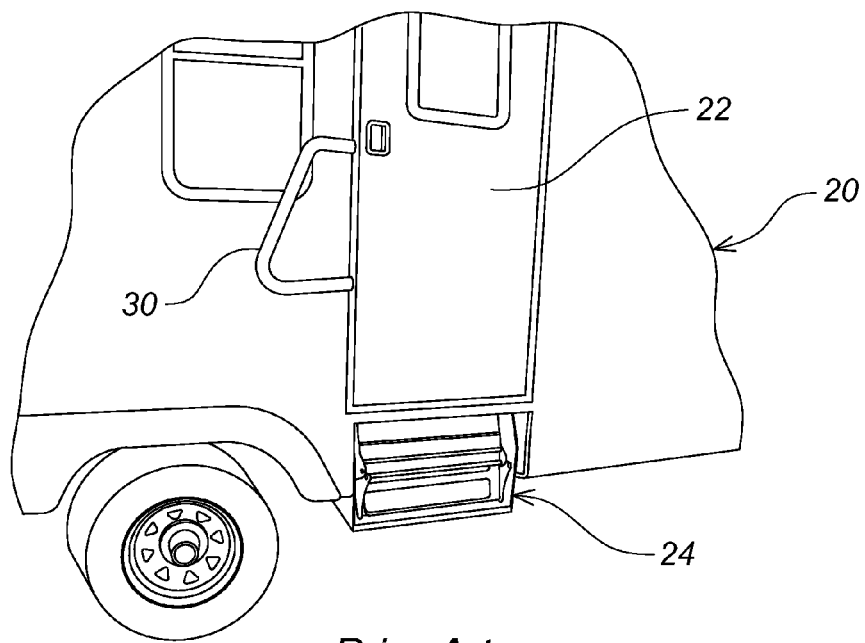
FIG. 2A is a detail showing the prior art retractable step assembly in retracted condition.
Figure 2B:
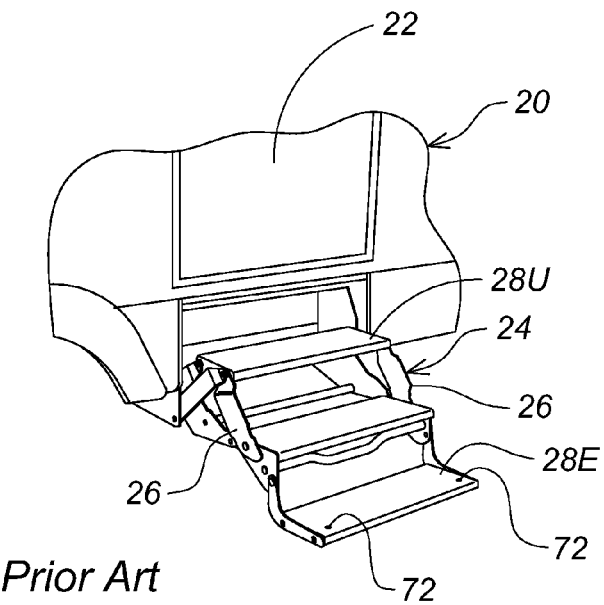
FIG. 2B is a detail showing the prior art retractable step assembly in extended condition.
Figure 3:
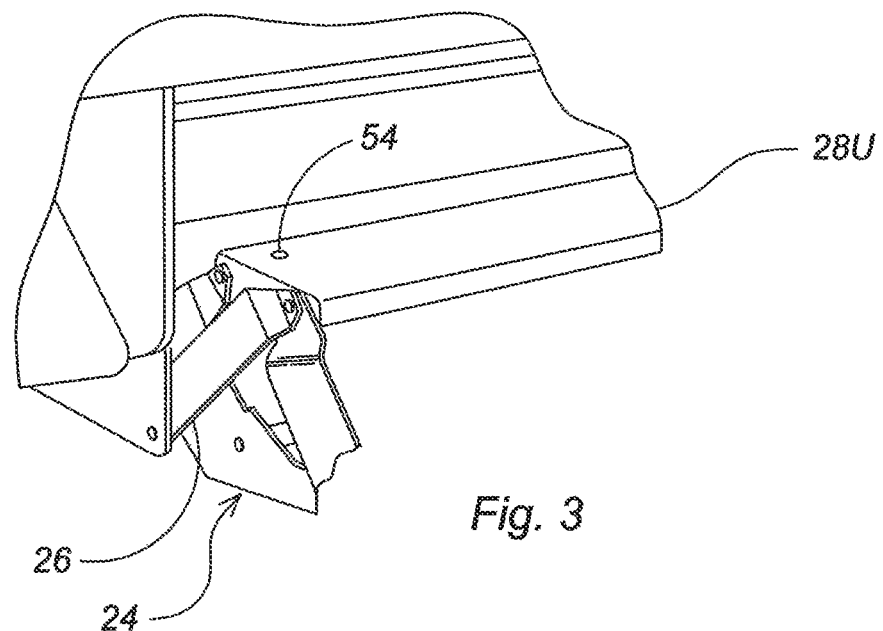
FIG. 3 is a detail showing a top step in the retractable step assembly with an aperture for use in coupling a proximal end of a platform.

As shown in FIGS. 1-3, a recreational vehicle (RV) 20 has a doorway 22 in its sidewall elevated above the ground a distance greater than a conventional step. A retractable step assembly 24 includes a pair of jointed swing arms 26 depending downwardly from the underside of the vehicle. A plurality of steps 18, typically two to four in number, are mounted on the swing arms 26. As best seen in FIG. 2A, a grab bar 30 may be provided on the RV 10 for use as a handrail with retractable step assembly 24. Turning then to FIG. 1, a portable porch 32 in accordance with the present invention is shown installed on RV 20 which may include, without limitation, a mobile trailer equipped with living space and amenities found in a home.

Portable porch 32 is configured to abut RV doorway 22 and to be attached to RV 20 to provide a surface for standing, sitting and performing activities that may not be possible on retractable step assembly 24. Portable porch 32 at least partially attaches to RV 20 by integrating with retractable step assembly 24. Portable porch 32 includes a platform 34, a plurality of adjustable legs 36, at least one railing 38 and a porch stairway 40 for additional functionality and stability. After use, the portable porch 32 may be sectioned and stored in a carriage 42 on a rear end of RV 20 as more particularly described below.

Platform 34 comprises a substantially planar, rigid confirmation, efficacious for supporting weight and typical movements that may be expected on the portable porch 32. In one embodiment, the platform 34 may extend about four feet out and six inches beyond each side of the doorway 22 but other sizes and dimensions may be utilized depending on the needs of a user and the dimensions of RV 20. Platform 34 may be manufactured from a rigid material, including without limitation, steel, aluminum, metal alloys, fiberglass and wood. In one embodiment the platform 34 includes an expanded metal surface 44 supported on a rectangular or square frame 46 formed of square tubing but other cross sectional shapes may be used and the expanded metal surface may be treated with a non-slip plastic coating. In all embodiments, the platform 34 has a proximal side 48 that abuts RV 20 and a distal side 50 that with flanking sides 52 forms an outer perimeter of the portable porch 32.

Proximal side 48 of the platform 34 is removably coupled to an upper step 28U of the retractable step assembly 24 such that the proximal side 48 sets flush against the upper step 28U and abuts RV 20. While various attaching means may be used such as clamps to couple the proximal side 48 of the frame 46 to the upper step 28U, in an embodiment of the invention illustrated in the drawings, at least one and preferably two spaced apart apertures 54 are drilled in the upper step 28U. Bolts 56 are passed through corresponding apertures 58 in the frame 46 along the proximal side 48 of the platform 34 in registry with the apertures 54 in the step 28Y and a wing nut 60 or other suitable fastener is threaded on the free ends of the bolts 56 to secure the coupling. This engagement provides stability to the section of the portable porch 32 that is proximal RV 20 while the distal side 50 is supported by the plurality of adjustable legs 36.

Figure 5:
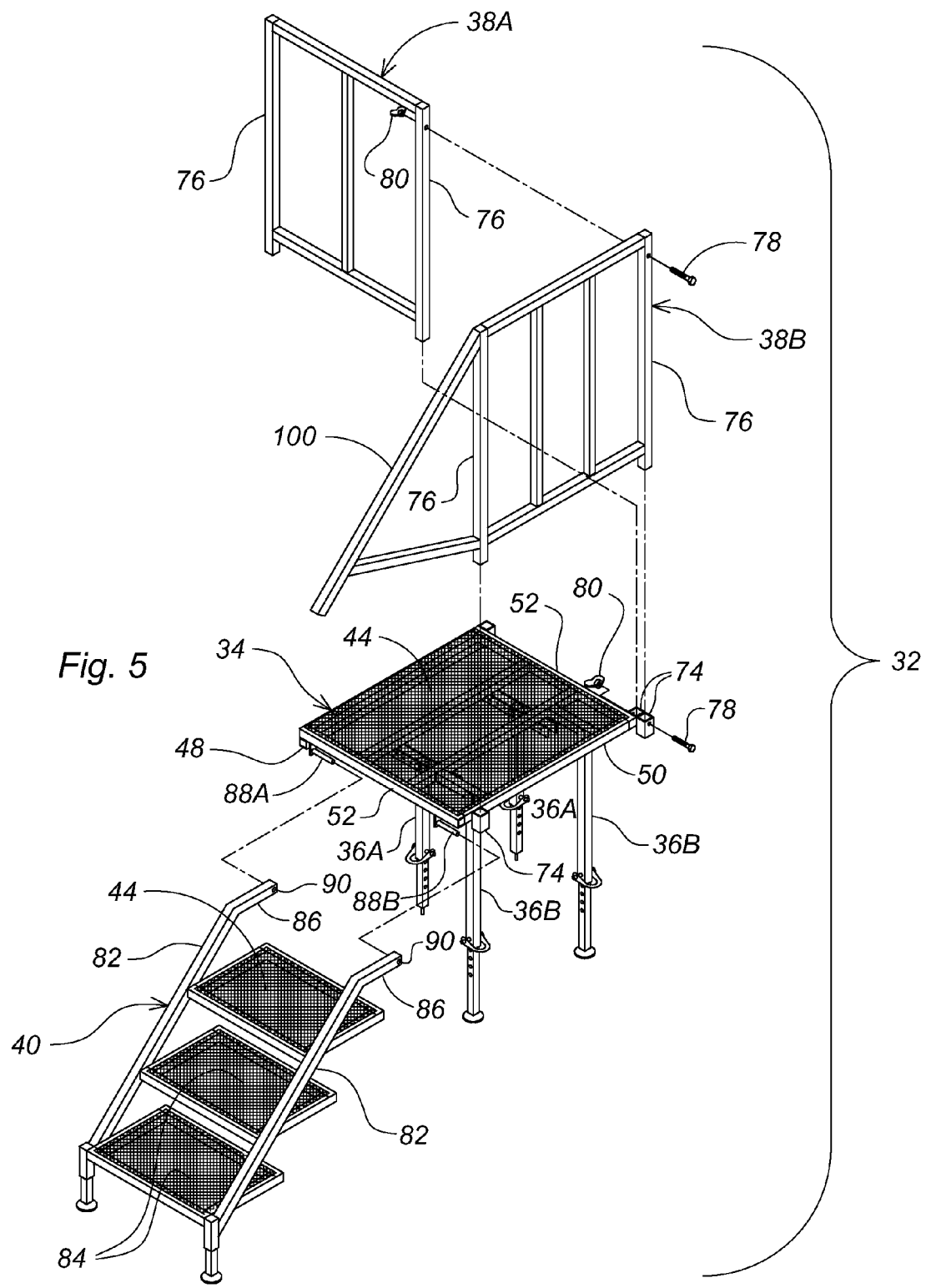
FIG. 5 is an exploded view of the major parts of the portable porch.
Figure 6:
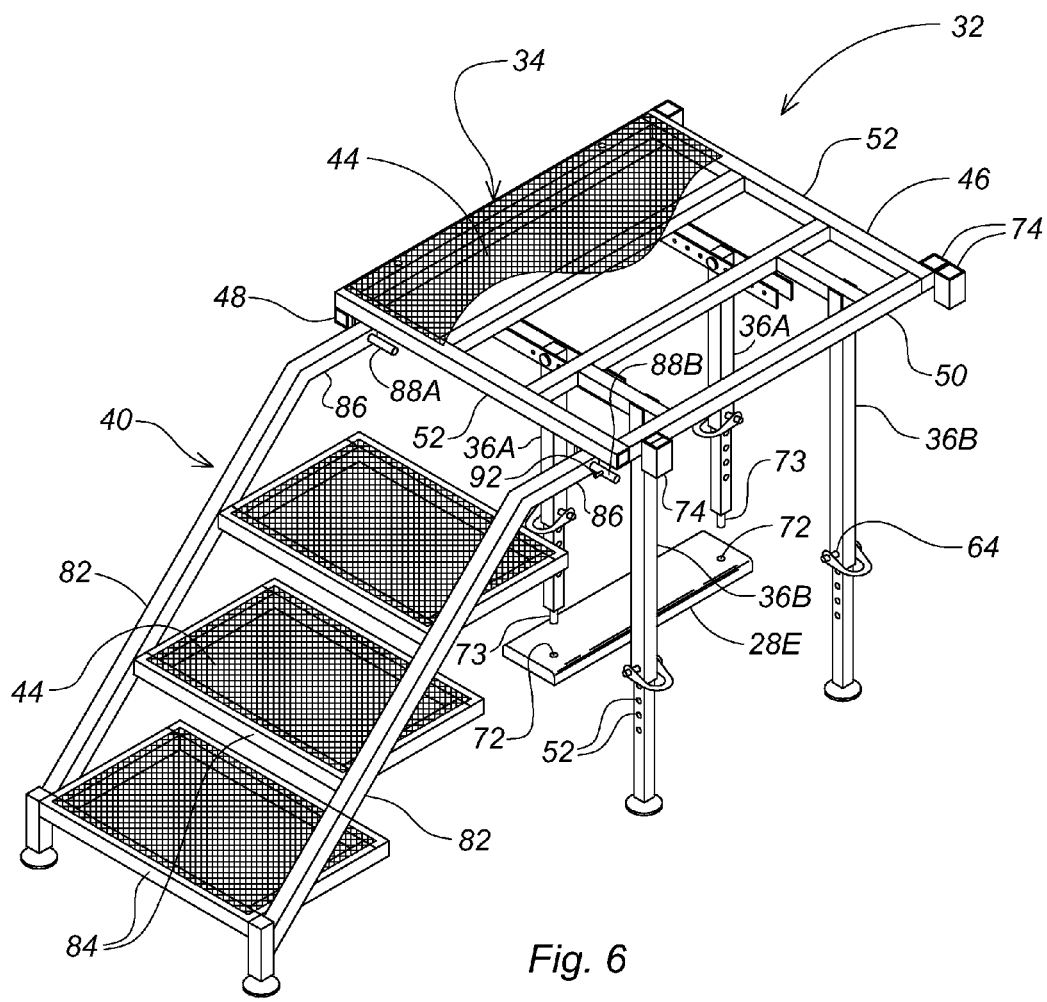
FIG. 6 is an assembled view of the portable porch without railing.
Figure 7:
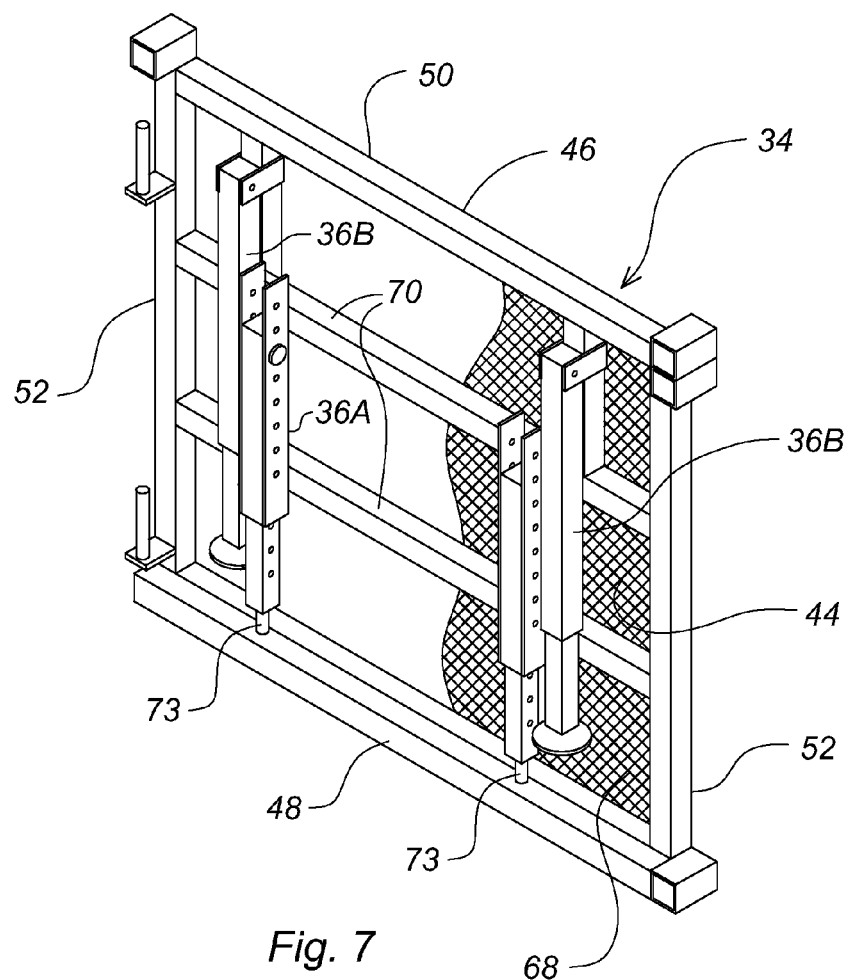
FIG. 7 is a perspective view of the platform with a plurality of adjustable legs shown folded against a lower surface; and, FIG. 8 is a perspective view of a carriage at the rear of the vehicle for storage and transport of the major parts of the portable porch shown exploded in FIG. 5.
Figure 8:
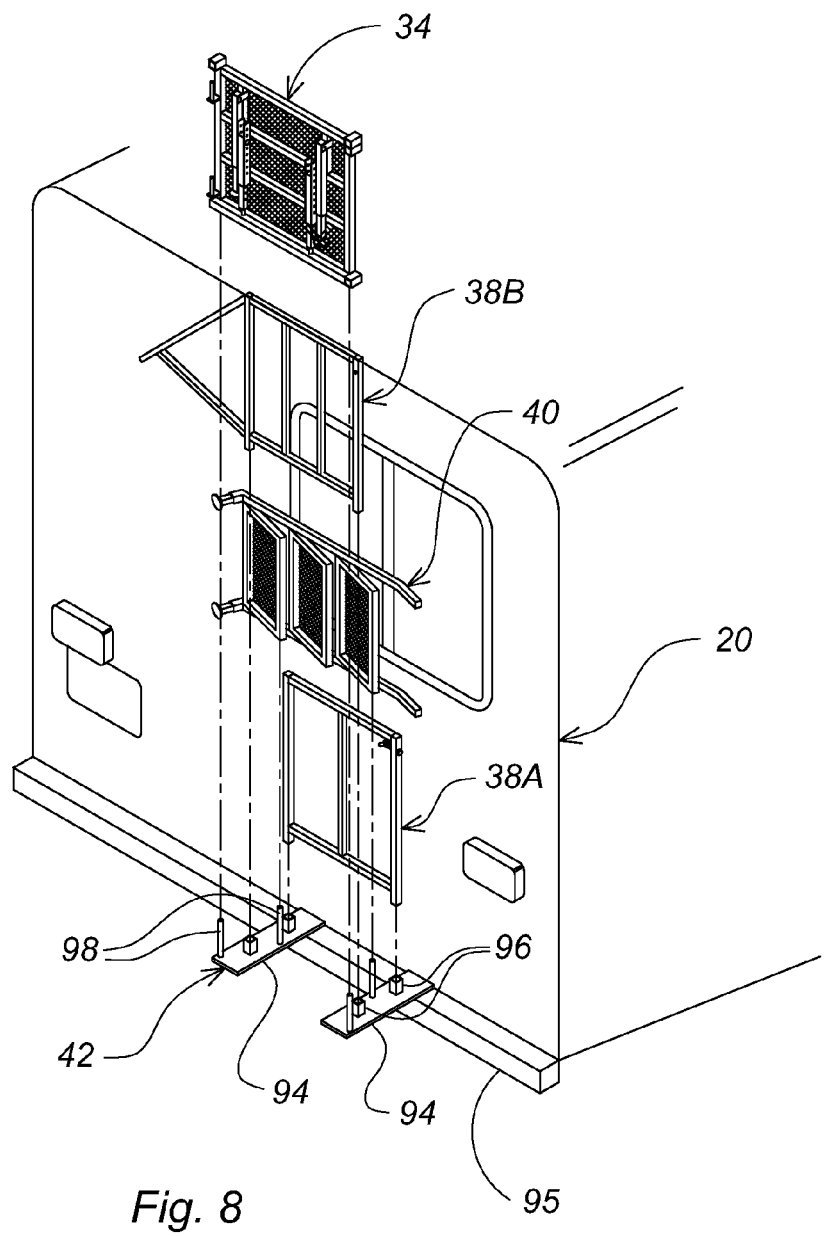

Turning now to FIG. 5B, the adjustable legs 36 extend downwardly from the platform 34 to provide support for the platform 34 along the distal side 50. The adjustable legs 36 may utilize a telescoping mechanism to extend and retract to a desired height. However, in other embodiments, the plurality of adjustable legs may adjust by folding, detaching into sections, collapsing and compressing. In one embodiment as shown in the drawings, adjustable legs 36 are tubular sections, the lower of which slidingly fits within the lumen of the upper section. While the adjustable legs 36 shown in the drawings are formed of square tubing, other cross-sectional shapes may be used, as well as solid bar stock for the lower telescoping section. A plurality of holes 62 are provided in the lower section of the adjustable legs 36 for engagement with a snap button provided on the upper section or in other arrangements as shown in the drawings, a hole 64 is provided in upper section with a pin and bail fastener 66 or the like is passed through aligned holes to secure the adjustable legs at a selected length. With continuing reference to the drawings, two of adjustable legs 36A are pivoted to a lower surface 68 on frame cross members 70 inboard of the distal side 50 and one or two legs 36B are pivoted to the lower surface 68 along the distal side 50 but more or less legs 36A, 36B may be used. Inboard legs 36A are removably coupled to an endmost step 28E in retractable step assembly 24 or to an intermediate step in other embodiments. While various attaching means may be used and for example without limitation, the coupling may be efficaciously achieved by providing apertures 72 in the selected step into which a pointed end 73 of the inboard legs 36A is passed but in other embodiments the legs 36A may be attached to a step in the retractable step assembly 24 through other fasteners. The weight of the platform 34 may secure the ends 73 of the legs 36A in the apertures 72, although for further security the ends 72 may have an aperture through which a keeper is passed, could be threaded and a nut attached, etc. The use of the existing retractable step assembly 24 to provide support enhances the portability and ease of use of the portable porch 32.

Outboard legs 36b may extend from the platform 34 lower surface 68 to engage the ground surface. Those skilled in the art, in light of the present teachings, will recognize that since RV 20 may be mobile, legs 36B may rest on a variety of ground surfaces having different slopes and compression factors. Adjusting the length of the legs 36B may be necessary to compensate for those differences to keep the platform 34 level.

Those skilled in the art will recognize that the platform 34 may be elevated a significant height about the ground surface and the presence of the at the least one railing 38 helps to prevent a user or object from falling off the platform 34. In some embodiments, the at least one railing 38 is provided in sections 38A, 38B and forms a peripheral boundary around two sides of the platform 34. Brackets 74 may be provided along one of sides 52 and the distal side 50 of the platform 34 for mounting the railing sections 36A, 36B. The sections 36A, 36B, like the frame 46 of the platform 34, may be formed of square tubing but other cross-sectional shapes and materials may be used. When the at least one railing 36 is formed of tubing, the endmost vertical members 76 of each section may extend below the bottom rail of the section and be received in the brackets 74. Aligned holes may be provided in the endmost vertical members 76 and the brackets 74 for receipt of a bolt 78 secured with a nut 80 or other fastener. Similarly, the endmost vertical members 76 may have apertures at their upper ends for securing the sections together with fasteners.

Porch stairway 40 is attached to the platform 34 to provide a stepped means for mounting and dismounting the platform 34. The porch stairway 40 may attach to any of the three sides of the platform 34 but in some embodiments the porch stairway 40 attaches to the left side or the right side of the platform 34. Porch stairway 40 includes a pair of stair stringers 82 from which stair treads 84 are supported. Like the platform 34 and the at least one railing 38, the stair stringers 82 and the stair treads 84 may be formed of tubing and expanded metal. An upper end of each stair stringer 82 has a dog leg 86 such that the stringer 82 is generally parallel to the platform 34 at the point of attachment. This configuration reduces the lateral pushing force applied to the platform 34 when a user walks up and down the stair treads 84. For attachment of the porch stairway 40 to the platform 34, a support rod 88A extends from the frame 46 at the proximal side 48 of the platform 34 towards the distal end along the lower surface 68 and a second support rod 88B aligned with the first support rod 88B extends outward from the distal side 50 of the platform 34. Apertures 90 are provided in the upper end of the stair stringers 82 through which supports rods 88A, 88B are passed and upon which the porch stairway 40 is hung. A fastener such as a nut and bolt arrangement may be provided to secure stringer 82 on second support rod 88B. Extendible legs 92 may be provided at the lower end of stair stringers 82 for use in leveling the porch stairway 40 with respect to the ground. It will be apparent to one skilled in the art that when the porch stairway 40 is attached along the distal side 50 of the platform 34 that both first and second support rods 88A, 88B are attached along the side edges 52 of the platform 34. In some embodiments the section 38B may extend along a side of the porch stairway 40 to provide a handrail for grasping while ascending and descending the stairs. In one alternative embodiment, porch stairway 40 may be configured with a ramp (not shown) rather than the treads 84 for enabling wheel chair accessibility.

Figure 4:
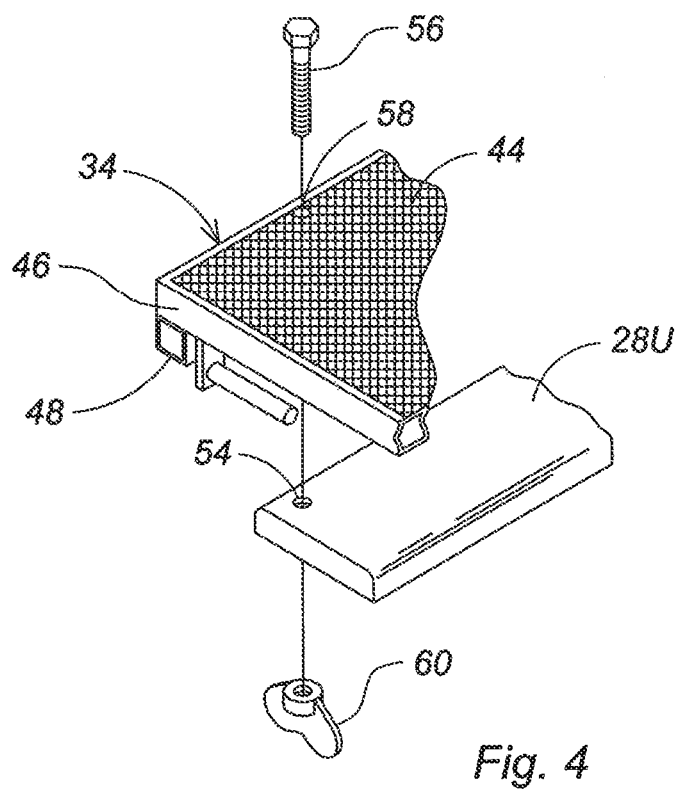
FIG. 4 is an exploded view showing one means for coupling the proximal end of the platform to the top step.

Turning now to FIG. 4, it is seen that the portable porch 32 may be disassembled by sectioning into parts. The parts may then be stowed on the RV 20 for travel. In one embodiment of the dissembling, the porch stairway 40 detaches from the platform 34 by sliding the stringers 82 off supports rods 88A, 88B after any fastening means 92 has been released. Similarly, the railing sections 38A, 38B may be disassembled from the platform 34 by sliding the endmost vertical members 76 out of brackets 74 after releasing any fastening means in the brackets or between the sections. Platform 34 is then removably uncoupled from the top step 28U of the retractable step assembly 28 and the legs 36A, 36B shortened if necessary, and pivoted against the lower surface 68 of the platform 34. The portable porch 32 is thus sectioned into three major components, the platform 34, the at least one railing 38 and the porch stairway 40. However, in some embodiments, the plurality of adjustable legs 36A, 36B may completely disassemble from the platform 34, or the at least one railing 38 may section into smaller railing pieces. In any case, the sectioned pieces may then be stowed in the carriage 42 attached to the RV 20.

In the embodiment illustrated in the drawings, the carriage 42 may include rack supports 94 cantilevers to a frame or bumper 95 of the RV 20. However, in other embodiments, the carriage 42 may positioned on other areas of the RV 20, including, without limitation, the underside, the front and the inside. In one embodiment, two pairs of brackets 96 are interleaved with two pairs of support rods 98 on rack supports 94 for sandwiching the disassembled sections of the portable porch 32 against the rear of the RV 20. To this end, the endmost vertical members 76 of the side section 38A of at the least one railing 38 are received in first pair of brackets 96A. Next, the ends of the supports for the stair treads 84 of the porch stairway 40 are slid over first pair of support rods 98A. The endmost vertical members 76 of other section 38B with the handrail with handrail 100 are then slid into second pair of brackets 96B and open ends of tubing forming the frame 46 of the platform 34 are slid over second pair of support rods 98B. The assembled stack may then be secured together with a bungee cord or the like.

In the above description, numerous specific details are set forth such as examples of some embodiments, specific components, devices, methods, in order to provide a thorough understanding of the construction and use of embodiments of the present disclosure. It will be apparent to a person of ordinary skill in the art that these specific details need not be employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

What is claimed:

1. A portable porch attached to a recreational vehicle having a retractable step assembly for accessing a doorway in the vehicle's sidewall in extended condition, the portable porch comprising:
   a platform, the platform configured to provide a support surface, the platform having a proximal end, the proximal end having apertures adapted to be coupled to a top step through corresponding apertures in the retractable step assembly;
   a plurality of adjustable legs, the plurality of adjustable legs being configured to extend from a platform lower surface, at least one adjustable leg adapted to engage a ground surface and at least one adjustable leg having an end adapted to be coupled to a step below the top step by a corresponding aperture in the retractable step assembly;
   at least one railing, the at least one railing configured to extend from a platform upper face, the at least one railing being disposed to position around a periphery of the platform;
   a porch stairway, the porch stairway being configured to attach to the platform.

2. The portable porch of claim 1 wherein said porch stairway has a pair of stringers between which a plurality of stair treads are supported, said stringers having a dog leg at the upper end that is generally parallel to the platform at a point of attachment to the platform.

3. The portable porch of claim 1 wherein said porch stairway has a pair of stringers between which a plurality of stair treads are supported and said platform has a first support rod extending from the proximal side along the lower surface of the platform and a second support rod aligned with the first support rod extending towards the distal side of the platform, said stringers having an aperture at the upper end through which the support rods are passed and by which the porch stairway is attached to the platform.

4. The portable porch of claim 1 wherein the platform is adapted to be coupled to the top step of the retractable step assembly with a bolt passing through one of said apertures in the platform and through said corresponding aperture in the top step, said coupling secured by threading a nut on the bolt.

5. The portable porch of claim 1 wherein the at least one adjustable leg having an end adapted to be coupled to the step below the upper step of the retractable step has a reduced end.

6. A portable porch attached to a recreational vehicle having a retractable step assembly for accessing a doorway in the vehicle's sidewall in extended condition, the portable porch comprising:

a platform, the platform configured to provide a support surface, the platform having a proximal side, a distal side and flanking sides, the proximal side having apertures adapted to be coupled to a top step through corresponding apertures in the retractable step assembly;

a plurality of adjustable legs, the plurality of adjustable legs being configured to extend from a platform lower surface, at least one adjustable leg adapted to engage a ground surface and at least one adjustable leg having an end adapted to be coupled to a step below the top step by a corresponding aperture in the retractable step assembly;

at least one railing, the at least one railing configured to extend from a platform upper surface, the at least one railing being disposed to position around a periphery of the platform;

a porch stairway, the porch stairway being configured to attach to the platform, said porch stairway having a pair of stringers between which a plurality of stair treads are supported, said stringers having a dog leg at the upper end that is generally parallel to the platform at a point of attachment to the platform, said platform have a first support rod extending from the proximal side along the lower surface of the platform and a second support rod aligned with the first support rod extending from the distal side of the platform, said stringers having an aperture at the upper end through which the support rods are passed and by which the porch stairway is attached to the platform.

7. The portable porch of claim 6 wherein the platform is coupled to the top step of the retractable step assembly with a bolt passing through one of said apertures in the platform and through the corresponding aperture in the top step, said coupling secured by threading a nut on the bolt.

8. The portable porch of claim 7 wherein the at least one adjustable leg is coupled to the step below the top step of the retractable step by passing a reduced end of the adjustable leg through the aperture in the step below the upper step.

9. The portable porch of claim 8 wherein the adjustable legs have telescoping sections with holes through which a keeper is passed for adjusting the length of the legs.

10. The portable porch of claim 6 wherein the at least one railing has first and second sections with endmost vertical members received in brackets provided on the platform, said first section mounted along one of the flanking sides and said second section mounted along the distal side and having a handrail extension along the porch stairway.

11. A carriage a storing the sections of the portable porch of claim 6 when the platform, the at least one railing and the porch stairway are disassembled, said carriage having a rack support configured to be mounted on a frame or bumper of the vehicle and having two pair of brackets interleaved with two pair of support rods.

12. The carriage of claim 11 wherein a first of said pair of brackets is configured to receive vertical members of a first section of the at least one railing, a first of said pair of support rods is configured to receive stair treads in the porch stairway, a second of said pair of brackets is configured to receive vertical members of a second section of the at least one railing and a second of said pair of support rods is configured to receive frame members of said platform.

\* \* \* \* \*